Figure 21:
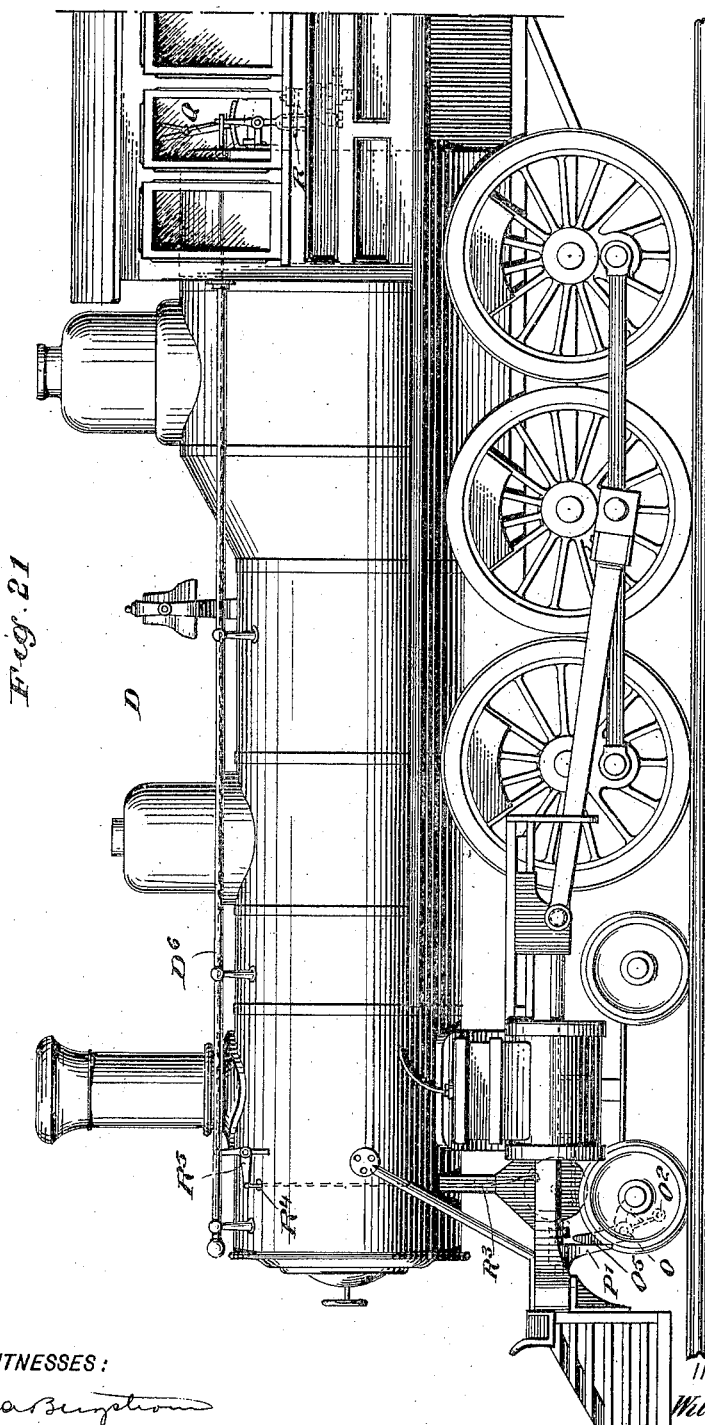

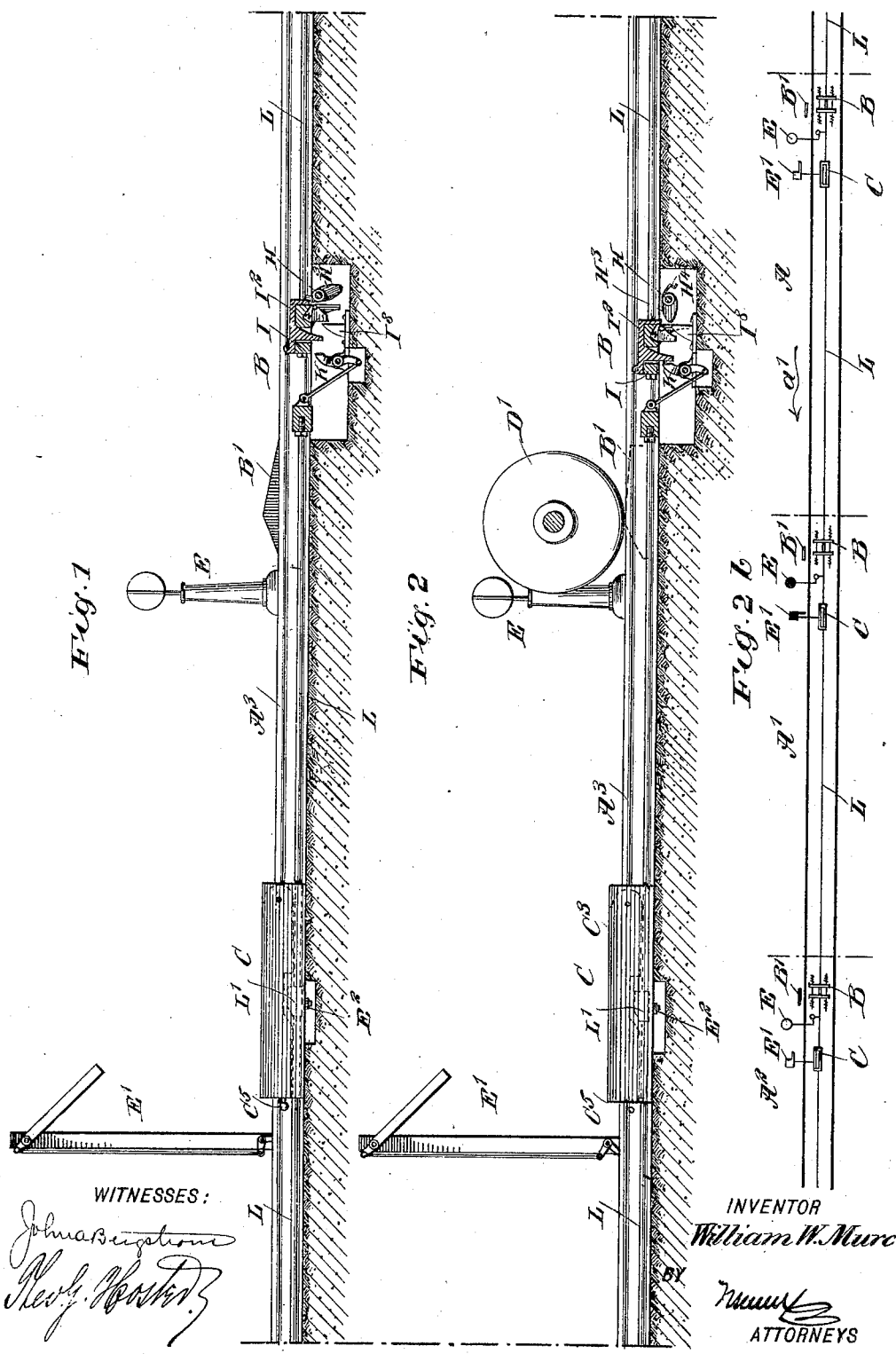

No. 688,745. Patented Dec. 10, 1901.
W. W. MURCH.
AUTOMATIC SAFETY GEAR AND SIGNAL SYSTEM.
(Application filed Mar. 9, 1901.)
(No Model.) 11 Sheets—Sheet 2.
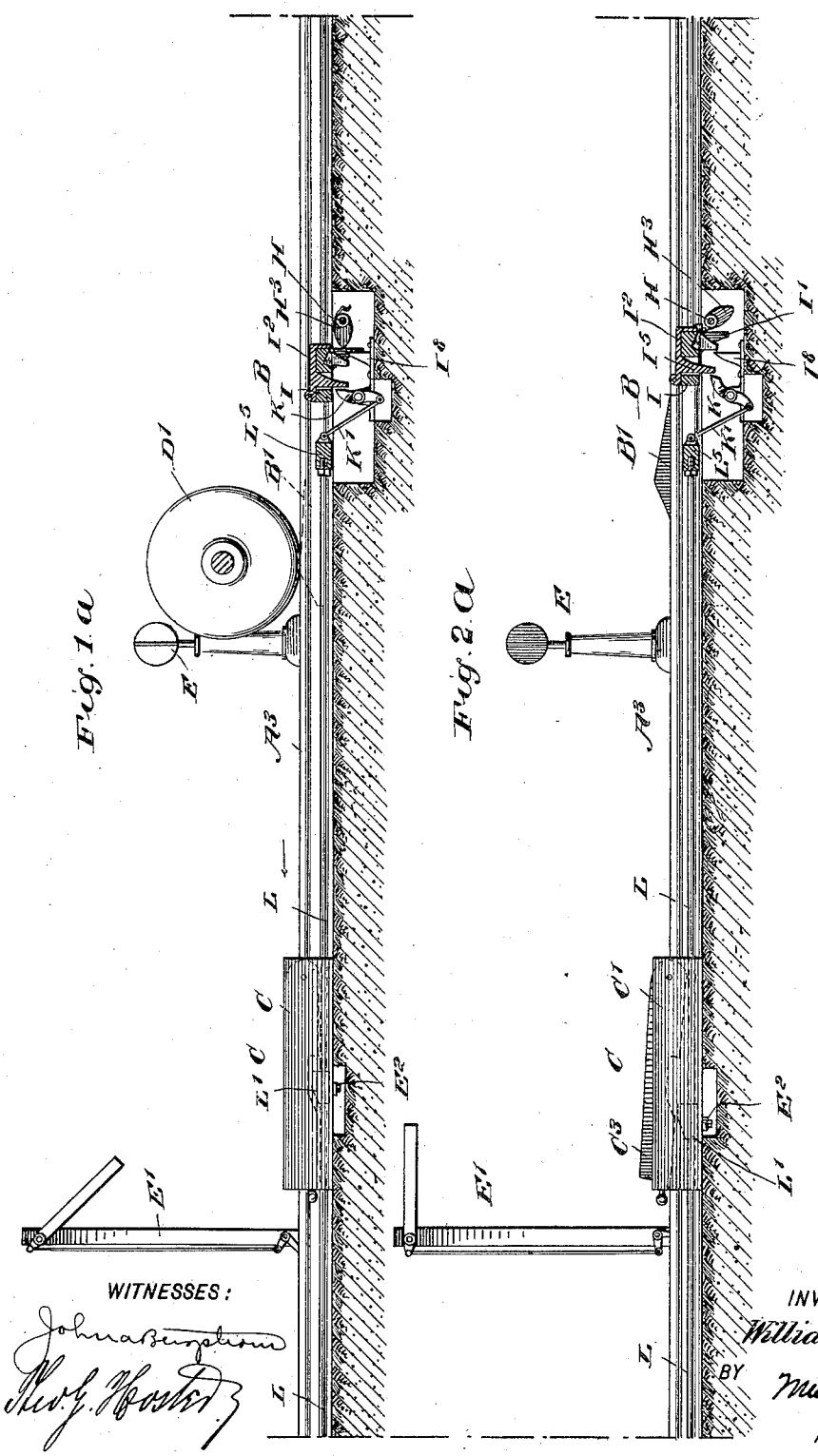
WITNESSES:
INVENTOR
William W. Murch
BY
ATTORNEYS No. 688,745. Patented Dec. 10, 1901.
W. W. MURCH.
AUTOMATIC SAFETY GEAR AND SIGNAL SYSTEM.
(Application filed Mar. 9, 1901.)
(No Model.) 11 Sheets—Sheet 3.
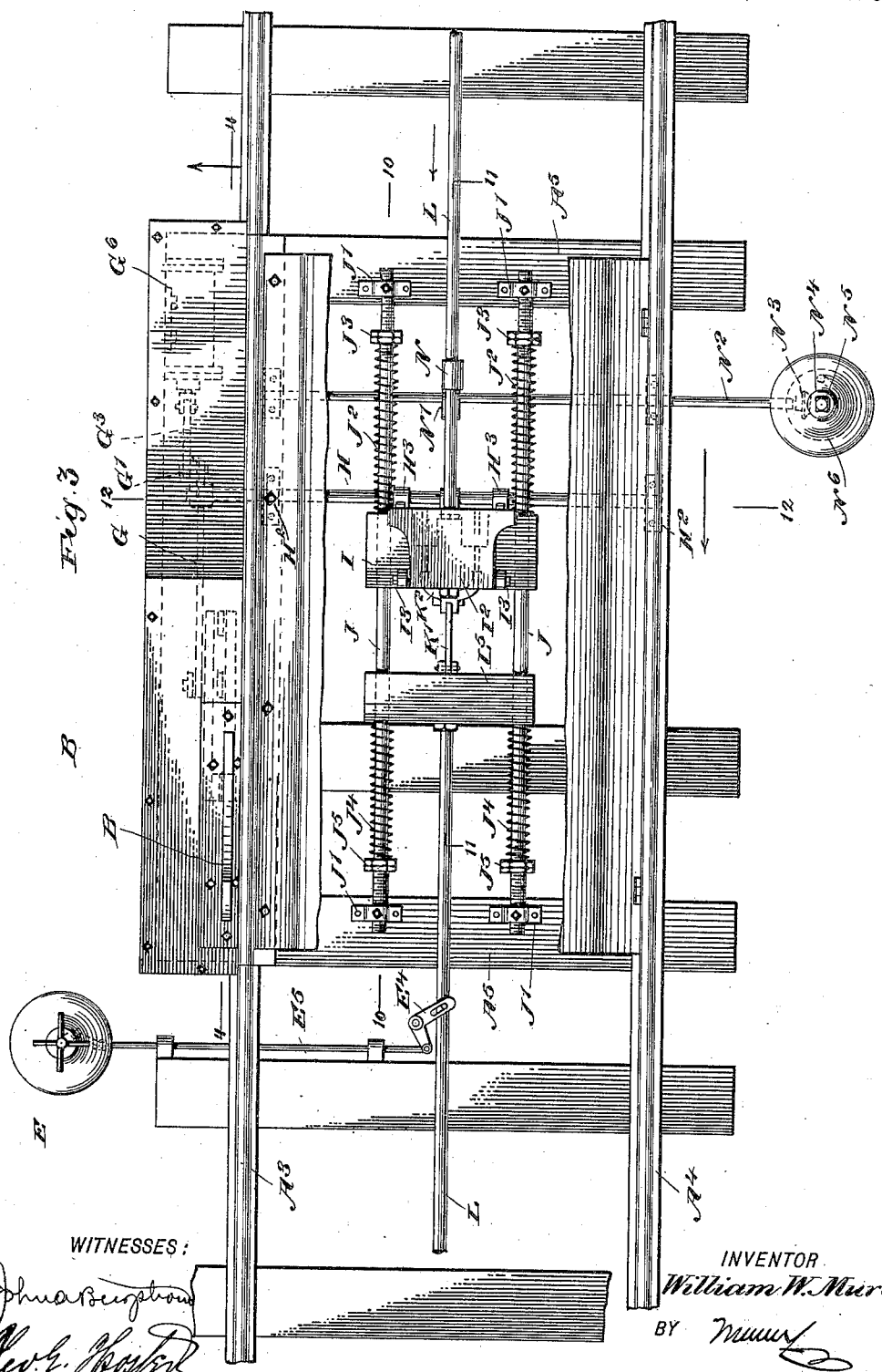
WITNESSES:
INVENTOR
William W. Murch
BY
ATTORNEYS No. 688,745. Patented Dec. 10, 1901.
W. W. MURCH.
AUTOMATIC SAFETY GEAR AND SIGNAL SYSTEM.
(Application filed Mar. 9, 1901.)
(No Model.) 11 Sheets—Sheet 4.
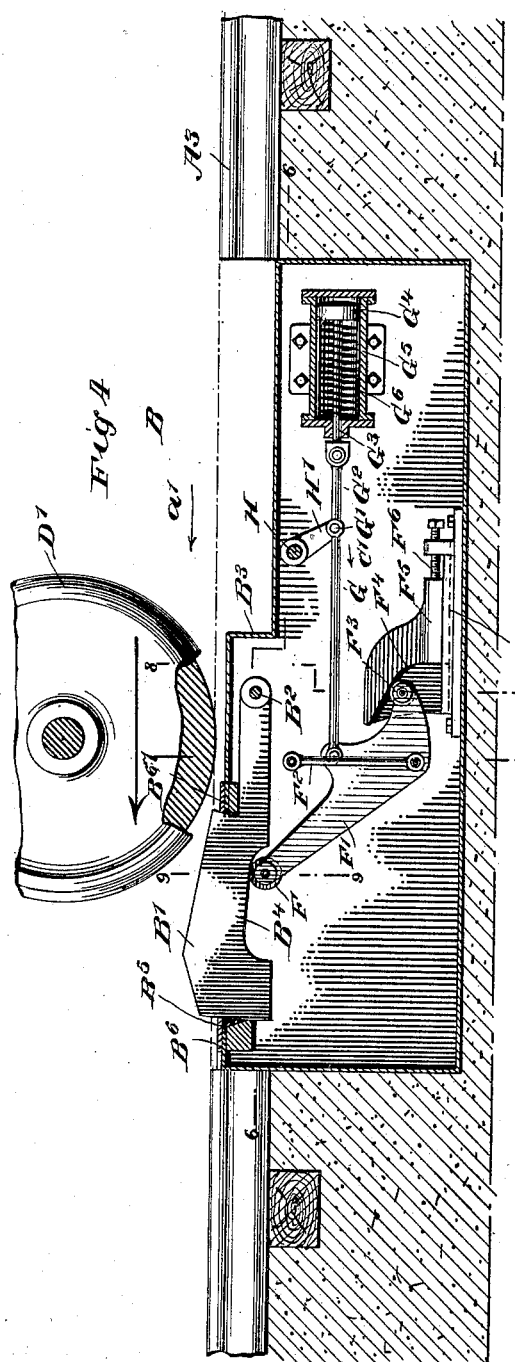
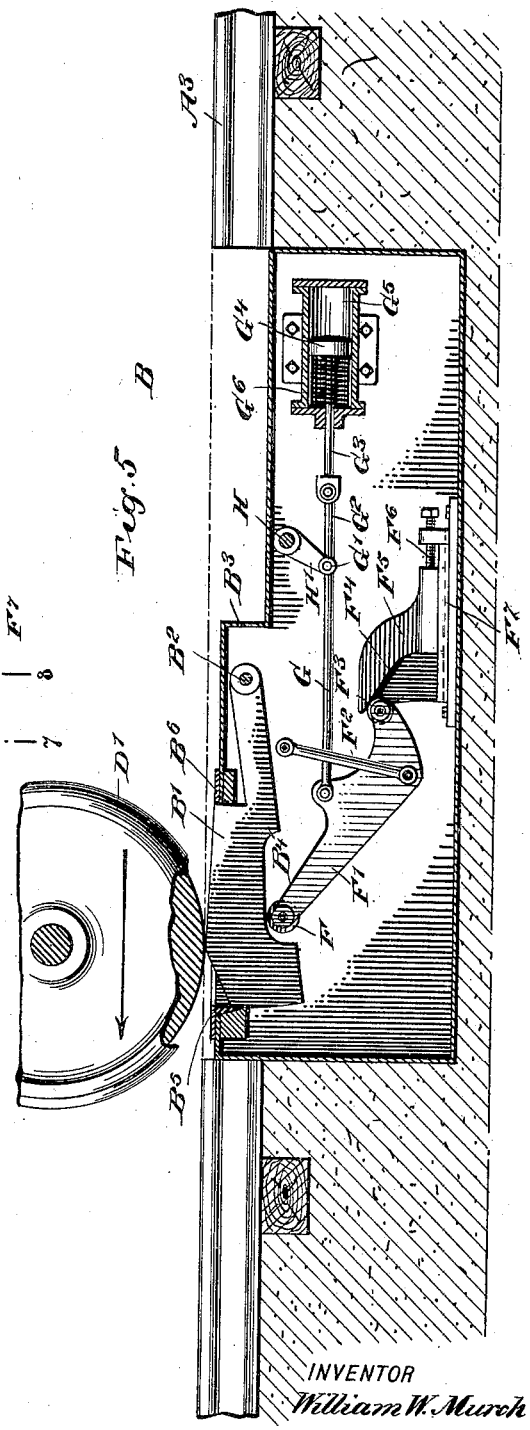
WITNESSES:
INVENTOR
William W. Murch
BY
ATTORNEYS No. 688,745. Patented Dec. 10, 1901.
W. W. MURCH.
AUTOMATIC SAFETY GEAR AND SIGNAL SYSTEM.
(Application filed Mar. 9, 1901.)
(No Model.) 11 Sheets—Sheet 5.
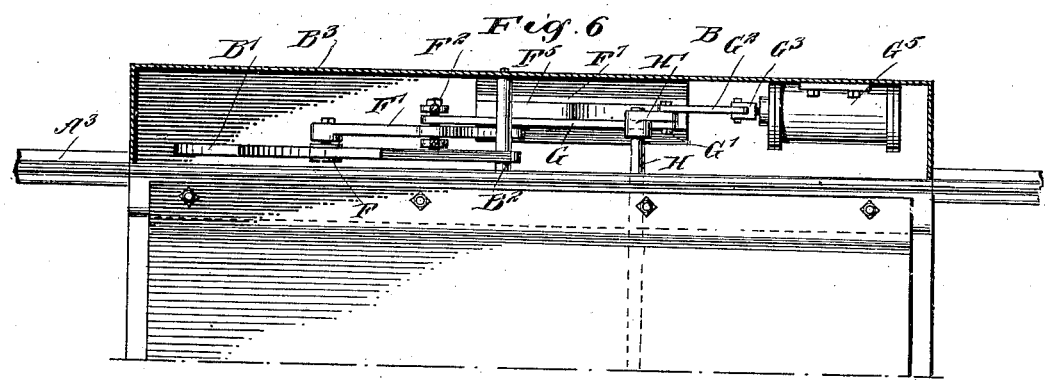
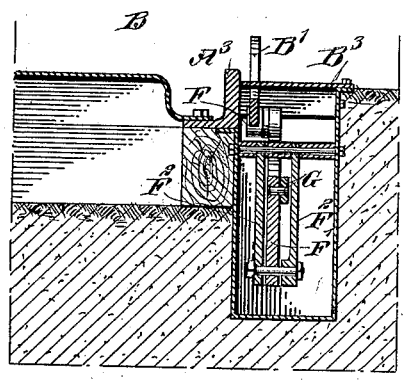
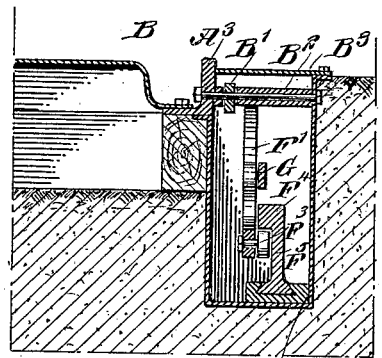
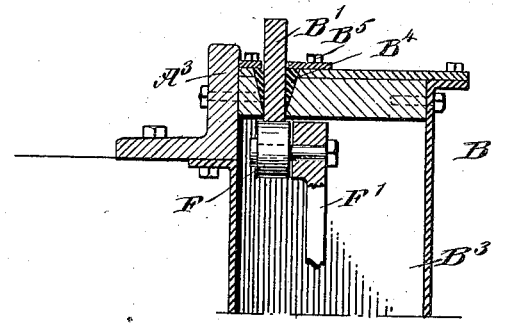
WITNESSES: INVENTOR
William W. Murch
BY
ATTORNEYS No. 688,745. Patented Dec. 10, 1901.
W. W. MURCH.
AUTOMATIC SAFETY GEAR AND SIGNAL SYSTEM.
(Application filed Mar. 9, 1901.)
(No Model.) 11 Sheets—Sheet 6.
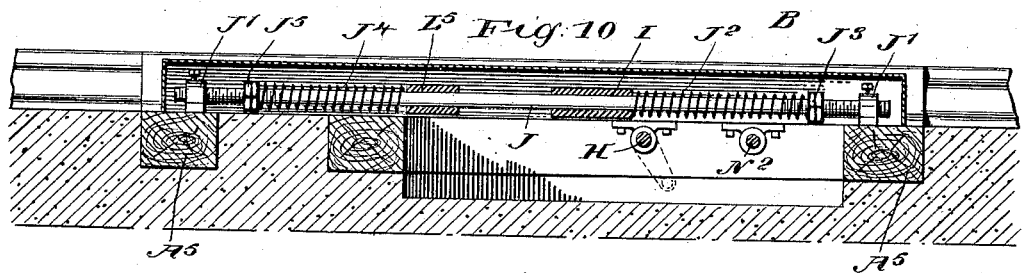
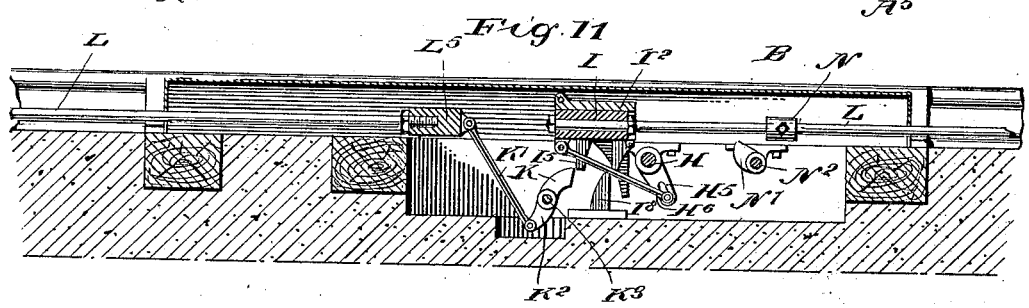
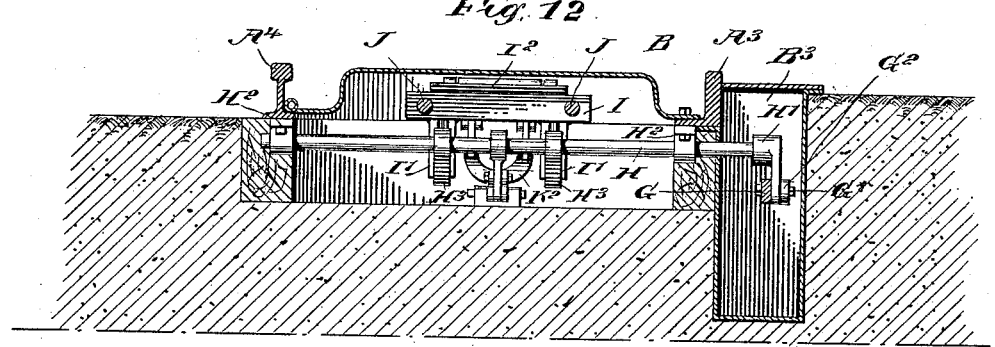
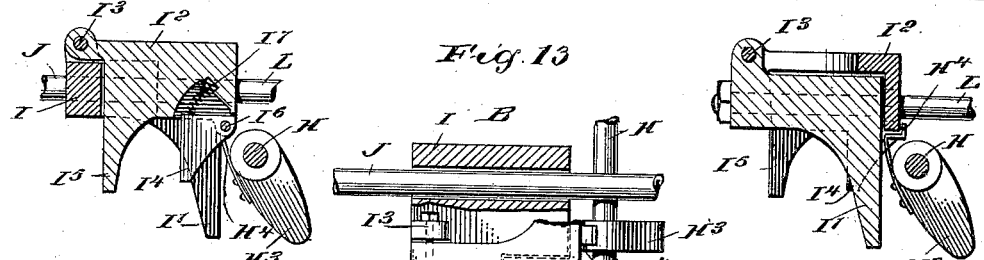
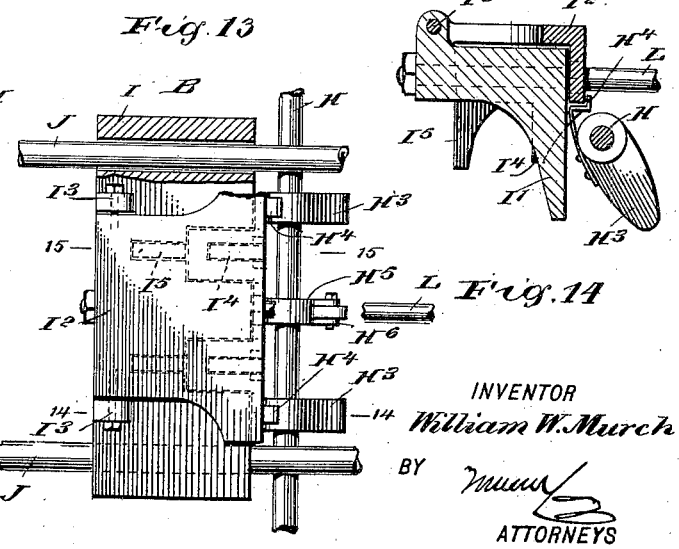
WITNESSES:
INVENTOR
William W. Murch
BY
ATTORNEYS

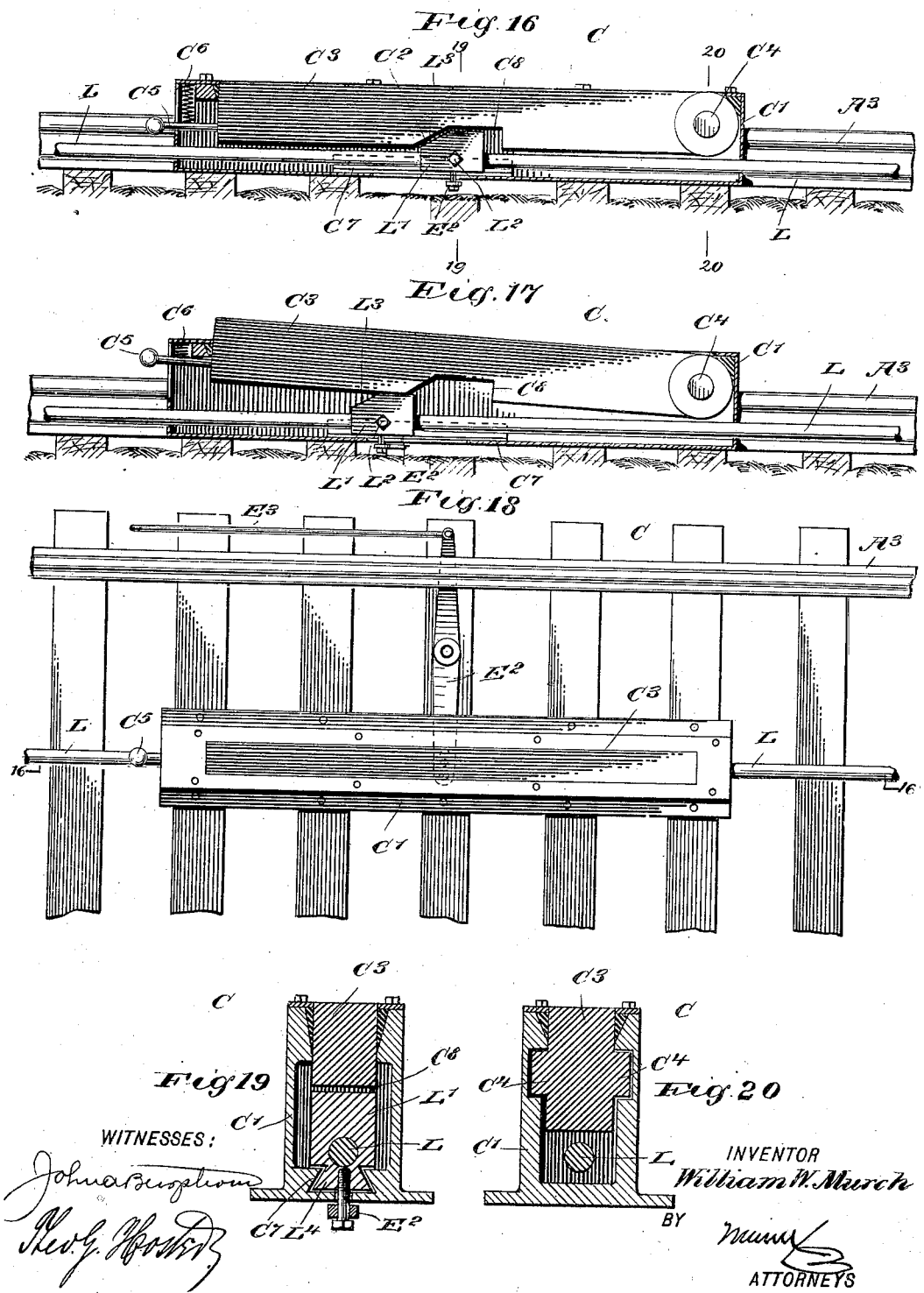

No. 688,745. Patented Dec. 10, 1901.
W. W. MURCH.
AUTOMATIC SAFETY GEAR AND SIGNAL SYSTEM.
(Application filed Mar. 9, 1901.)

(No Model.) 11 Sheets—Sheet 8.

WITNESSES:

INVENTOR
William W. Murch
BY
ATTORNEYS

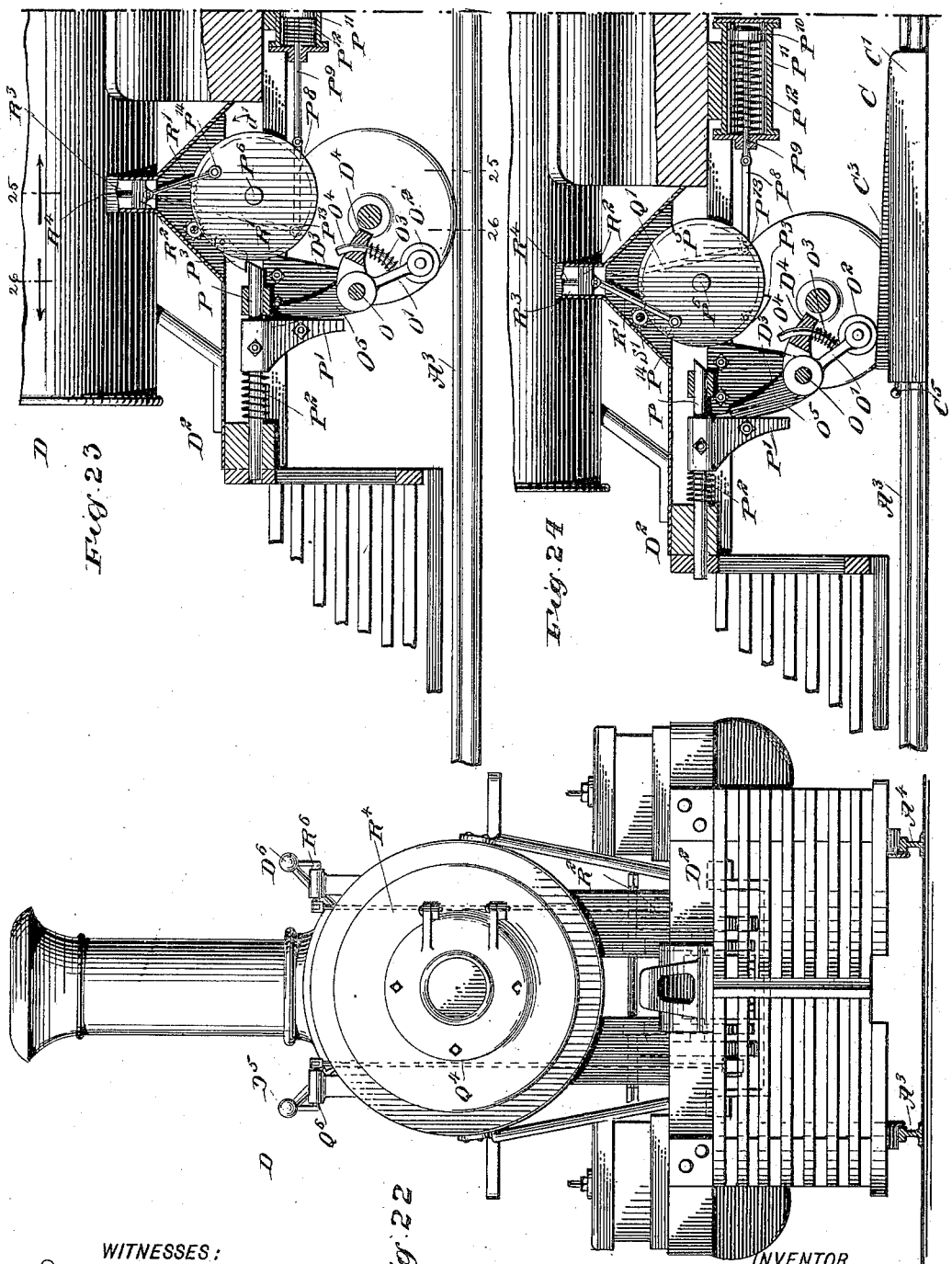

No. 688,745. Patented Dec. 10, 1901.
W. W. MURCH.
AUTOMATIC SAFETY GEAR AND SIGNAL SYSTEM.
(Application filed Mar. 9, 1901.)
(No Model.) 11 Sheets—Sheet 10.
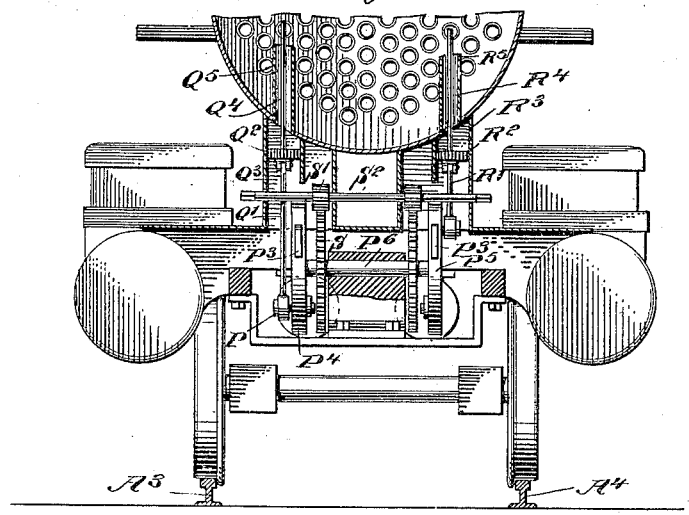
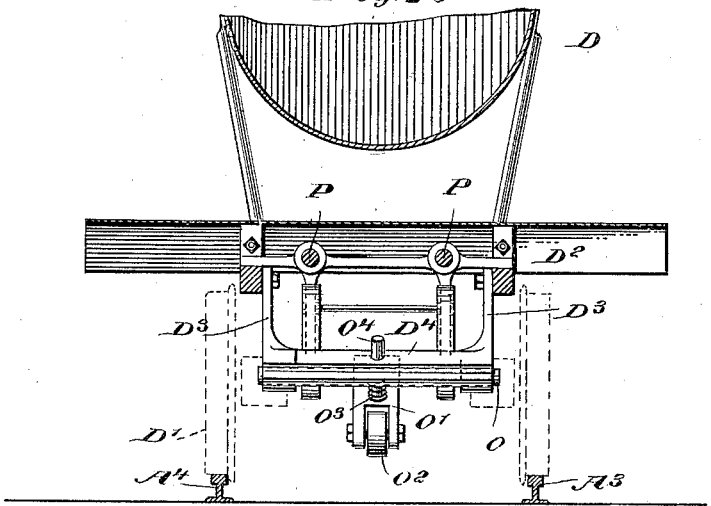
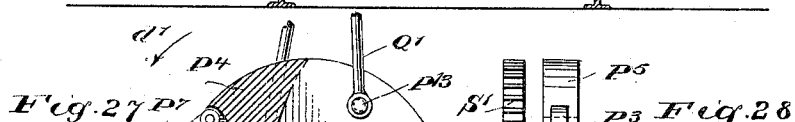
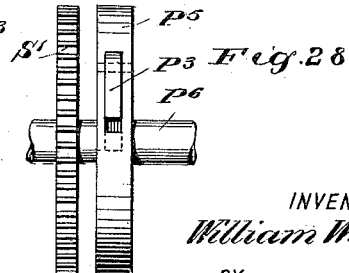
WITNESSES:
INVENTOR
William W. Murch
BY
ATTORNEYS No. 688,745. Patented Dec. 10, 1901.
W. W. MURCH.
AUTOMATIC SAFETY GEAR AND SIGNAL SYSTEM.
(Application filed Mar. 9, 1901.)
(No Model.) 11 Sheets—Sheet 11.
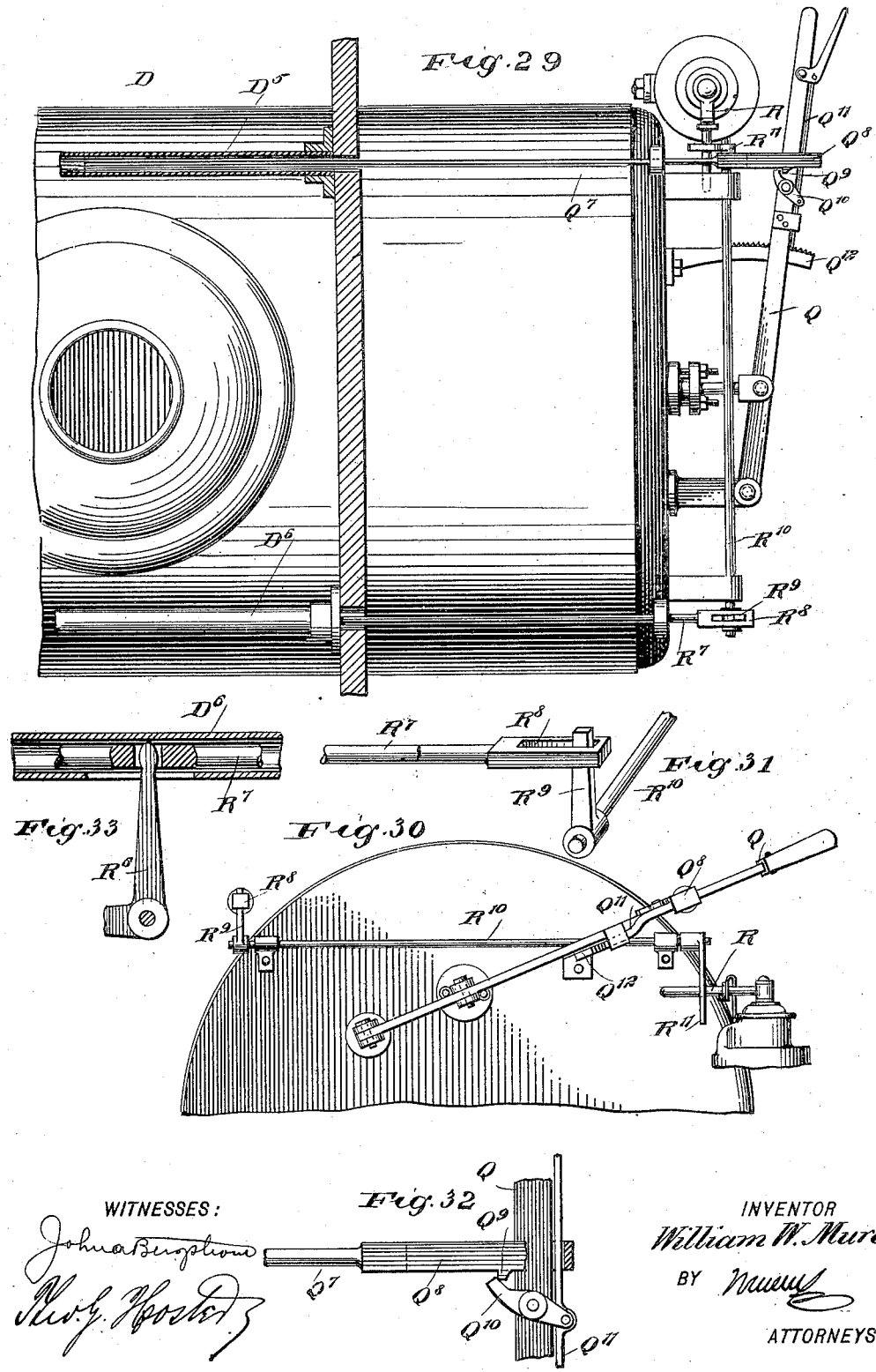
WITNESSES:
INVENTOR
William W. Murch
BY
ATTORNEYS

UNITED STATES PATENT OFFICE.

WILLIAM WARNER MURCH, OF BROOKLYN, NEW YORK, ASSIGNOR OF ONE-HALF TO JOHN R. PARKER, OF BROOKLYN, NEW YORK.

AUTOMATIC SAFETY GEAR AND SIGNAL SYSTEM.

SPECIFICATION forming part of Letters Patent No. 688,745, dated December 10, 1901.

Application filed March 9, 1901. Serial No. 50,460. (No model.)

*To all whom it may concern:*

Be it known that I, WILLIAM WARNER MURCH, a citizen of the United States, and a resident of the city of New York, borough of Brooklyn, in the county of Kings and State of New York, have invented a new and Improved Automatic Safety Gear and Signal System, of which the following is a full, clear, and exact description.

The invention relates to block systems for railroads; and its object is to provide a new and improved automatic safety gear and signal system more especially designed for automatically setting the signals for the different blocks or sections by the passing trains and for preventing collisions by automatically shutting off the steam and applying the brake to bring the train to a standstill without any action on the part of the engineer in case the latter has disregarded a danger-signal and is about to pass upon a section of the road occupied by another train.

The invention consists of novel features and parts and combinations of the same, as will be fully described hereinafter and then pointed out in the claims.

A practical embodiment of the invention is represented in the accompanying drawings, forming a part of this specification, in which similar characters of reference indicate corresponding parts in all the views.

Figure 1, Fig. 1ª is a reduced sectional side elevation of the improvement. Fig. 2, Fig. 2ª is a like view of the same with parts in a different position. Fig. 2ᵇ is a diagrammatic plan view of the improvement as applied to three blocks of the block system. Fig. 3 is a plan view of the track device with parts broken out. Fig. 4 is a sectional side elevation of the same on the line 4 4 in Fig. 3. Fig. 5 is a like view of the same with parts in a different position. Fig. 6 is a sectional plan view of the same on the line 6 6 in Fig. 4. Fig. 7 is a transverse section of the same on the line 7 7 in Fig. 4. Fig. 8 is a like view of the same on the line 8 8 in Fig. 4. Fig. 9 is an enlarged transverse section of the same on the line 9 9 in Fig. 4. Fig. 10 is a longitudinal sectional side elevation of the same on the line 10 10 in Fig. 3. Fig. 11 is a like view of the same on the line 11 11 in Fig. 3. Fig. 12 is a cross-section of the same on the line 12 12 in Fig. 3. Fig. 13 is an enlarged plan view, with part in section, of the locking device for the cross-head employed for resetting the gear. Fig. 14 is a sectional side elevation of the same on the line 14 14 in Fig. 13. Fig. 15 is a similar view of the same on the line 15 15 in Fig. 13. Fig. 16 is a longitudinal sectional side elevation of the controller for automatically actuating the mechanism employed for closing the throttle on the locomotive and for operating the brake mechanism to apply the brakes, parts being in an inactive position. Fig. 17 is a like view of the same with parts in an active position. Fig 18 is a plan view of the same. Fig. 19 is a cross-section of the same on the line 19 19 in Fig. 16. Fig. 20 is a similar view of the same on the line 20 20 in Fig. 16. Fig. 21 is a side elevation of a locomotive with the mechanism for automatically operating the throttle-lever and the air-brake mechanism. Fig. 22 is a front end elevation of the same. Fig. 23 is a sectional side elevation of part of the same with parts in a locked dormant position. Fig. 24 is a similar view of the same with parts in a released position. Fig. 25 is a transverse section of the same on the line 25 25 in Fig. 23. Fig. 26 is a similar view of the same on the line 26 26 in Fig. 23. Fig. 27 is an enlarged side elevation of the locking-wheel, part being in section. Fig. 28 is a front end elevation of the same. Fig. 29 is an enlarged sectional plan view of the cab end of the locomotive, showing the connection with the throttle-lever and the connection with the engineer's valve-handle. Fig. 30 is a rear end elevation of the same. Fig. 31 is an enlarged perspective view of part of the mechanism for operating the engineer's valve-handle. Fig. 32 is an enlarged sectional side elevation, with part broken out, of the connection with the throttle-lever; and Fig. 33 is an enlarged sectional side elevation of part of the mechanisms for operating the throttle-valve lever and the engineer's valve-handle.

As illustrated in Fig. 2ᵇ, the blocks A A' A² are each provided with a track device B and a controller C, of which the former is actuated by a wheel D' of a locomotive or other motor D at the head of a train, and said track device in one block (say the block A²) controls the setting to "danger" of the controller C in the preceding block A' and also controls the resetting of the track device B in this block, and thereby brings the controller C in the second preceding block A back into a normal inactive position. The controller C operates in conjunction with the signals E E', which display "safety" or "danger," according to whether the block ahead is free or is occupied by a train, and said controller when in a danger or active position serves to actuate a mechanism on the locomotive or motor D to shut off the motive-agent supply and to apply the brakes, and thereby bring the train to a standstill in case the engineer disregards the danger-signal at the entrance of a block. When the sections A A' A² are clear, then the signals display "safety" and the controllers C are in an inactive position, as shown in Fig. 1, Fig. 1ª, and if a train now passes through the block A and upon the section A' in the direction of the arrow $a'$ then the wheel D' of the locomotive actuates the track device B in the section A', and thereby moves the controller in the block A into an active or danger position, as shown in Fig. 2ª. At the same time the signals E E' in the block A display "danger" and the track device in this block is reset. When the train moves out of the block A' into the block A², then the track device B in said block A² is actuated and causes the controller C in the block A' to move into an active or danger position and at the same time causes the signals E E' in the block A' to display "danger." At the same time the track device B in the block A' is reset and causes the controller C in the block A to move back to a normal safety position and the signals to "safety." When the train is moving along in the block A², the first block A is clear, while the second block A' is set to "danger," and a second train can now enter the first block A, and when the block A' is reached the danger-signals displayed signify to the engineer that this block should not be entered. Should the engineer disregard the danger-signals at the entrance of the block A', then the controller C, set to "danger," in this block A' automatically actuates mechanism on the locomotive to shut off the motive agent and apply the brakes to bring the train to a standstill without any action on the part of the engineer.

The detail mechanism is as follows: The track device B is provided with a lever B', arranged adjacent to the outside of the track-rail A³, the top of said lever being preferably made V-shaped, and the lever B' is pivoted at B² in a casing B³, arranged in the track-bed at the outside of the rail A³. The under side of the lever B' (see Figs. 4 and 5) is formed with a recess B⁴, engaging the peripheral surface of a friction-roller F, journaled in a lever F' hung on a link F², pivoted in the casing B³, and on said lever F' is journaled a friction-roller F³, traveling on the inclined under side F⁴ of a block F⁵, longitudinally adjustable by a screw-rod F⁶ in a projection F⁷. The lever F' is also pivotally connected with a link G, connected by a pivot-pin G' with a link G², pivotally connected with the piston-rod G³ of a piston G⁴, mounted to reciprocate in a longitudinally-extending cylinder G⁵, attached to the casing B³. A spring G⁶ is coiled on the piston-head G³ within the cylinder G⁵ and rests with one end against the cylinder-head, the other end pressing on the piston G⁴, so as to hold the several parts described normally in the position illustrated in Fig. 4—that is, to hold the lever B' in an uppermost position—so that the tread of the train-wheel passing over the rail A³ engages said lever B' and in pressing the same imparts a swinging motion to the lever in a downward direction. (See Fig. 5.) When this takes place, the lever B' imparts a swinging motion to the lever F', whereby a forward movement is given to the links G G² and piston-rod G³ to the piston G⁴ to compress the spring G⁶ in the cylinder G⁵. By having the lever F' hung on a link F² and its friction-roller F³ rolling off on the inclined under side F⁴ of the block F⁵ it is evident that said link F' swings freely without undue friction to insure at all times a proper working of the track device.

In order to prevent rain, snow, dust, or the like from passing into the casing B³ and to the working parts contained therein, I provide the top of the casing B³ at the free end of the lever B' with a suitable packing B⁵ for rendering the casing dustproof and still permit a free swinging movement of the lever B'. The packing B⁵ is wedge-shaped in cross-section, as is plainly indicated in Figs. 4, 5, and 9, and is fitted upon correspondingly shaped walls of the opening in the top of the casing, through which extends the free end of the lever B', said packing being held in position by plates B⁶, bolted or otherwise secured to the top of the casing.

The pivot-pin G', above referred to, is engaged by a depending arm H', secured to a shaft H, extending transversely and journaled in suitable bearings H², attached to the under side of the track-rails A³ A⁴, as is plainly indicated in Figs. 3 and 12. On the shaft H are secured wipers H³, adapted to engage depending arms I' on a cross-head I, mounted to slide longitudinally on guide-rods J, secured at their ends in bearings J', attached to the ties A⁵ of the railroad-track, as is plainly indicated in Figs. 3 and 10. Each of the wipers H³ is provided with a spring-arm H⁴ (see Figs. 14 and 15) for engaging the free end of a cap I², pivoted at I³ on the top of the cross-head I, and said cap I² is preferably made L-shaped to engage with its depending portion the rear of the cross-head, as shown in Fig. 14. The cap I² is provided with depending lugs I⁴ I⁵, of which the lug I⁵ is integral with the cap I² and the lug I⁴ is pivoted at I⁶ to the cap and is pressed on by a spring I⁷ for holding the lug I⁴ normally in a lowermost position, as shown in Fig. 15, but to allow the lug to swing upward and pass a lug I⁸ on the return stroke of the cross-head I, as hereinafter more fully explained. The lug I⁸ is secured to the track-bed and limits the forward movement of the cross-head I as long as the cap I² is in a lowermost position; but when a swinging motion is given to the wipers H³ then their spring-arms H⁴ impart an upward swinging motion to the cap I², so that the lug I⁴ is lifted out of engagement with the lug I⁸, and then the wipers H³ engage and press the depending arms I' to move the cross-head I in a forward direction. The cross-head I is pressed in a forward direction by springs J², coiled on the guide-rods J and resting with their rear ends on nuts J³, held adjustably on said guide-rods. The fixed lugs I⁵ of the caps I² are adapted to be engaged by arms K, forming part of the controller C ahead of the track device in question, while the cross-head I is rigidly attached to a rod L, extending rearwardly to the controller C and to the track device B of the preceding block. The rod L extends through the casing C' of the controller C, as is plainly shown in Figs. 16 to 20, and on said rod L, within the casing C', is adjustably secured a block L' by set-screws L², and this block L' has its upward forward portion formed with a bevel L³, adapted to engage a corresponding bevel C² on the under side of the lever C³, fulcrumed at its rear end at C⁴ in the casing C'. (See Figs. 16 and 17.) The forward end of the lever C³ carries a rod C⁵, pressed on by a spring C⁶, so as to hold the lever C³ normally in a lowermost position—that is, with its top flush with the top of the casing C', as indicated in Figs. 16, 19, and 20. (See also Fig. 1, Fig. 1ᵃ, and Fig. 2.) The bottom of the block L' is formed with a dovetailed portion L⁴, mounted to slide in a corresponding dovetailed groove C⁷ in the bottom of the casing C', (see Fig. 19,) said block normally extending in a recess C⁸ in the under side of the lever C³, as shown in Fig. 16. When the cross-head I is moved forward by the action of the wipers H³, as previously mentioned, then a forward movement is given to the rod L, so that the block L' imparts an upward swinging motion to the lever C³ against the tension of the spring C⁶, as shown in Fig. 17, the controller then being in an active position to actuate the mechanism on the locomotive D to shut off the motive agent and apply the brakes, as hereinafter more fully described.

The under side of the block L' is pivotally connected with a lever E², (see Fig. 18,) connected with the operating mechanism E³ of the signal E', so that when the rod L moves forward and the controller C is moved into an active position, as shown in Fig. 17, then the signal E' is set to "danger," as indicated in Fig. 2ᵃ. The rod L is also connected with a bell-crank lever E⁴, forming part of the operating mechanism E⁵ of the signal E, (see Fig. 3,) so that when the rod L is moved forward as described the signal E is also set to danger position. (See Fig. 2ᵃ.)

In order to prevent rain, snow, dust, and other impurities from passing into the casing C, said casing is provided with a suitable packing, similar to the one above described with reference to the lever B' and the casing B³, so that further description of the same is not deemed necessary.

The rear end of the rod L carries a cross-head L⁵, mounted to slide on the guide-rods J in front of the corresponding cross-head I, as is plainly indicated in Figs. 3, 10, and 11. The cross-head L⁵ is pressed rearwardly by springs J⁴, coiled on the guide-rods J and abutting with their forward ends on nuts J⁵, adjustable on the threaded forward ends of said guide-rods J. The cross-head L⁵ is connected by a link K' with an arm K² on a shaft K³, carrying the arms K, previously mentioned, and adapted to engage the fixed depending lugs I⁵ of the cross-head I.

The operation is as follows: When the track device B and the controller C are in a normal position, as indicated in Fig. 1, then the lever C³ of the controller is in a lowermost position when the lever B' of the track device is in an uppermost or raised position and the cross-head I is in a rearmost position, the lug I⁴ abutting against the fixed lug I⁸ and the lugs I⁵ standing a distance away from the arms K of the controller C ahead of the track device B. (See Fig. 1.) Now when a train enters the block and the wheel D' depresses the lever B', as previously mentioned and shown in Fig. 1ᵃ, then a turning motion is given to the shaft H in the direction of the arrow c', as indicated in Fig. 4, to cause the wiper-arms H⁴ to first swing the cap I² upward, so as to disengage the lugs I⁴ from the lugs I⁸ and to then allow the wipers H³ to move the cross-head I forward and exert a pull in a forward direction on the rearwardly-extending rod of this cross-head and to bring the cross-head into the position shown in Fig. 1ᵃ. This forward pulling of the cross-head I and rod L causes the block L' on the rod L to impart an upward swinging motion to the lever C³ of the controller, so that this controller in the preceding block is set to danger position. As the track device B in this preceding block is in the position shown in Fig. 1ᵃ, it is evident that the forward movement of the rod L, as described, causes its cross-head L⁵ to impart a swinging motion to the shaft K³ and arm K by the link K' and arms K², so that said arms K push on the depending lugs I⁵, and thereby shift the cross-head I backward into a rearmost position, the lug I⁴ passing over the next lug I⁸ and then again engaging this lug and locking the cross-head in a rearmost normal position. When the wheel D leaves the lever B', said lever immediately returns to an uppermost normal position, owing to the action of the spring G⁶ on the piston-rod G³ and the parts connecting the piston-rod with the lever F', which engages the lever B'. Thus a return swinging motion is given to the arm H' of the shaft H, so that the latter is turned back to its normal position, thereby bringing the wipers H³ and the arms H⁴ back into an active position before the cross-head I is reset—that is, pushed backward by the action of the arms K, as above described—and which action takes place upon the train entering the block ahead and actuating the lever B' thereof, as above explained.

From the foregoing it will be seen that when the wheel D' imparts a downward swinging motion to the lever B' in a block then the controller in the preceding block is moved to a danger position and the cross-head I of the track device in this preceding block is pushed rearward to cause the controller in the second preceding block to return to a normal position, as the block L' then moves back into the normal position, (shown in Fig. 16,) and the lever C³ of this controller returns to a normal position by its own weight and the action of the spring C⁶. In order to insure a forward movement of the cross-head I in case the wipers H³ become defective, I provide the shaft H with an arm H⁵, connected by a link H⁶ with the under side of the cross-head I, as shown in Figs. 11 and 12.

In order to move the rod L rearward by hand in case repairs are to be made, I provide the rod L with a block N, adapted to be engaged by an arm N' on a shaft N², (see Figs. 3 and 11,) said shaft extending transversely and to the outside of the track-rail A⁴ to carry at its outer end a bevel gear-wheel N³ in mesh with a bevel gear-wheel N⁴, secured on the lower end of a vertical shaft N⁵, journaled in a stand N⁶ and adapted to be engaged at its upper end by a wrench or other tool for turning the shaft N⁵, and thereby the shaft N², to engage the arm N' with the block N when the cross-head I is in a forward position. By the swinging motion of the arm N' the block N is pushed rearward and with it the rod L to push the block L' from under the lever C³ back into the notch C⁸ to allow the controller-lever C³ to move back to a normal position.

The mechanism on the locomotive for automatically shutting off the motive agent and applying the brakes is actuated at the time the locomotive passes over a controller having its lever C³ in an uppermost inclined position. For this purpose the following arrangement is made: On the forward end of the locomotive-frame D² is secured a hanger-frame D³, in which is journaled a transversely-extending shaft O, having a downwardly and rearwardly extending arm O', in which is journaled a friction-roller O², adapted to travel on the inclined top of the controller-lever C³, as is plainly indicated in Fig. 24. A spring O³ holds the arm O' normally in a lowermost position, as shown in Fig. 23, and this spring O³ is actuated by a segmental arm O⁴, mounted to slide in a cross-bar D⁴ of the hanger-frame D³. When the friction-roller O² travels over the lever C³, then a rearward and upward swinging motion is given to the arm O' to turn the shaft O against the tension of the spring O³, and when the friction-roller O² leaves the controller-lever C³ then the spring O³ returns the arm O' and shaft O to the normal position. (Shown in Fig. 23.) On the shaft O is secured an upwardly-extending wiper O⁵, adapted to push the cross-head P' forward, said cross-head being secured on two bolts P, mounted to slide longitudinally in suitable bearings arranged on the locomotive-frame. A spring P² presses the cross-head P', so as to normally hold the latter and the bolts P in a rearmost position—that is, with the bolts in engagement with teeth P³, pivoted in the periphery of the crank-disks P⁴ P⁵, secured on a shaft P⁶, extending transversely and journaled in suitable bearings on the locomotive-frame D². Each tooth P³ is held in an outermost position by a spring P⁷, (see Fig. 27,) so that the bolts P lock the crank-disks P⁴ P⁵ and shaft P⁶ against rotation in the direction of the arrow d'. (See Figs. 23 and 27.) Each of the crank-disks P⁴ P⁵ is pivotally connected by a link P⁸ with the piston-rod P⁹ of a piston P¹⁰, mounted to reciprocate in a cylinder P¹¹, secured to the locomotive-frame, as indicated in Figs. 23 and 24. A spring P¹², coiled on the piston-rod P⁹, rests with one end against one of the cylinder-heads and presses with the other end the piston P¹⁰, so as to force the latter rearward when the bolts P move out of engagement with the teeth P³ upon the wiper O⁵, pushing the cross-head P' forward at the time the friction-roller O² travels on the top surface of the lever C³. (See Fig. 24.) The bolts P normally lock the crank-disks P⁴ P⁵ against rotation, as described, the springs P¹² then being compressed, as indicated in Fig. 23; but as soon as the bolts P move out of engagement with the teeth P³ then the spring P¹² forces the piston P¹⁰ rearward, and the piston-rod P⁹ and link P⁸ impart a rotary motion to the crank-disks in the direction of the arrow d' to bring the disks to the position shown in Fig. 24. The crank-disk P⁴ is connected with a throttle-lever Q, and the other crank-disk P⁵ is connected with the engineer's brake-lever R, and the connecting mechanisms are arranged in such a manner that the throttle-lever Q is actuated to shut off the steam, and then the engineer's lever R is actuated to apply the brakes.

The intermediate mechanism between the disk P⁴ and the throttle-lever Q is arranged as follows: A wrist-pin P¹³ on the crank-disk P⁴ is connected by a pitman Q' with a piston Q², mounted to slide in a vertically-disposed open-ended cylinder Q³, extending on the under side of the smoke-box of the boiler, as is plainly shown in Figs. 24 and 25. The piston Q² has its piston-rod Q⁴ extending upwardly through a tube Q⁵, reaching through the smoke-box, and the upper end of said piston-rod Q⁴ is pivotally connected with a bell-crank lever $Q^6$, engaging a rod $Q^7$, mounted to slide longitudinally in the hollow hand-rail $D^5$ of the locomotive, as is plainly indicated in Fig. 29. The rear end of the rod $Q^7$ extends into the cab of the locomotive and is provided with a loop $Q^8$, through which extends the throttle-lever Q, as is plainly illustrated in Figs. 29, 30, and 32. On the loop $Q^8$ is a lug $Q^9$, adapted to engage a lever $Q^{10}$, connected with a pawl $Q^{11}$ on the throttle-lever Q and serving to lock the hand-lever in position on a segment $Q^{12}$ in the usual manner. When the crank-disk $P^5$ is released and is caused to turn in the direction of the arrow $d'$, as previously mentioned, then the pitman $Q'$ first imparts a downward sliding motion to the piston $Q^2$, so that the piston-rod $Q^4$ actuates the bell-crank lever $Q^6$ to move the rod $Q^7$ forward, so that the lug $Q^9$ first unlocks the pawl $Q^{11}$, and then the loop $Q^8$ imparts a forward swinging motion to the lever Q to close the throttle-valve, and thereby shut off the steam from the locomotive-engine.

The connection between the crank-disk $P^5$ and the engineer's lever is arranged as follows: On the crank-disk $P^5$ is a wrist-pin $P^{14}$, connected by a pitman $R'$ with a piston $R^2$, mounted to slide vertically in a cylinder $R^3$, depending from the smoke-box of the locomotive, and said piston $R^2$ has its piston-rod $R^4$ extending upwardly through a pipe $R^5$, reaching vertically through the smoke-box. The upper end of the piston-rod $R^4$ is connected with a bell-crank lever $R^6$, engaging a rearwardly-extending rod $R^7$, (see Figs. 29, 30, 31, and 33,) extending in the hollow hand-rail $D^6$ of the locomotive. On the rear end of the rod $R^7$ is arranged a loop $R^8$, engaging an arm $R^9$, secured on one end of a shaft $R^{10}$, extending transversely at the rear end of the locomotive-boiler and journaled in suitable bearings attached thereto. The other end of the shaft $R^{10}$ carries a fork $R^{11}$, straddling the engineer's lever R, so that when a turning motion is given to the crank-disk $P^5$, as above explained, then the pitman $R'$ imparts a downward motion to the piston $R^2$, and the latter by the piston-rod $R^4$, the bell-crank lever $R^6$, and the rod $R^7$ imparts a swinging motion to the arm $R^9$, whereby the shaft $R^{10}$ is turned and the fork $R^{11}$ imparts a swinging motion to the engineer's brake-lever R to turn the latter from the running position to a position for application of brakes, so that the brakes are applied. It is expressly understood that the crank-disks $P^4$ $P^5$ are simultaneously released when the friction-roller $O^2$ travels over the controller-lever $C^3$, so that the mechanisms above mentioned are simultaneously actuated. By reference to Figs. 23 and 24 it will be seen that the wrist-pins $P^{13}$ and $P^{14}$ are so arranged that during the first part of the turning motion of the crank-disks the wrist-pin $P^{13}$ moves downward, and thus causes a forward swinging movement of the throttle-lever Q, while during the same period the other wrist-pin $P^{14}$ moves upward, and hence the loop $R^8$ moves rearward and does not turn the arm $R^9$, and hence the brakes are not applied until after the steam is shut off. Thus the action is successive—that is, the steam is shut off, and then the brakes are applied to bring the train to a standstill in a comparatively short time. Thus the train is automatically brought to a standstill without any action on the part of the engineer, so that collision with the train ahead is completely avoided.

By having the loops $Q^8$ and $R^8$ the engineer is enabled to work the throttle-lever Q and the engineer's brake-lever R in the usual manner during the ordinary running of the train. When, however, the throttle-lever Q and the engineer's brake-lever R are automatically actuated, as described, then it is necessary for the engineer to reset the entire device on the front of the locomotive to bring the rods $R^7$ and $Q^7$ back to their former position before the engineer can again actuate the levers Q and R. For the purpose described the shaft $P^6$ is provided with gear-wheels S, in mesh with pinions $S'$ on a transverse shaft $S^2$, journaled in suitable bearings on the front end of the locomotive, the outer ends of the shaft being polygonal for the application of a wrench, crank-arm, or like tool to permit the engineer to turn the shaft $S^2$, pinions $S'$, and gear-wheels S to rotate the shaft $P^6$ in the reverse direction and bring the crank-disks back to their forward position, the released bolts P again engaging the teeth $P^3$, as previously explained.

Having thus fully described my invention, I claim as new and desire to secure by Letters Patent—

1. A safety gear and signal system for railroads, comprising a track device controlled by a train-wheel, a controller in advance of the track device, for controlling the signals and for controlling mechanism on a locomotive, to automatically shut off the motive agent and to apply the brakes, said track device and controller being located on the track at the beginning of a block in the block system, the track device in the main block controlling the setting to "danger" of the controller in the preceding block, and also controlling the resetting of the track device in this block, to bring the controller in the second preceding block back to a normal inactive position, as set forth.

2. A safety gear and signal system for railroads, comprising a track device and a controller for controlling signals and for controlling mechanism on a locomotive, to automatically shut off the motive agent and to apply the brakes, said device having a lever adapted to be depressed by a train-wheel, a cross-head, a connection between the lever and the cross-head to move the latter forward on the downward movement of the lever, and a rod attached to the cross-head and extending rearwardly, said rod carrying means for actuating said controller, to set the latter to danger position, as set forth.

3. A safety gear and signal system for railroads, comprising a track device and a controller for controlling signals and for controlling mechanism on a locomotive, to automatically shut off the motive agent and to apply the brakes, said device having a lever adapted to be depressed by a train-wheel, a cross-head, a connection between the lever and the cross-head to move the latter forward on the downward movement of the lever, a rod attached to the cross-head and extending rearwardly, said rod carrying means for actuating said controller, to set the latter to danger position, and a spring device for said connection, to move the latter and the lever back to a normal position after the cross-head is moved and the lever is relieved of pressure of the wheel, as set forth.

4. A safety gear and signal system for railroads, comprising a track device and a controller for controlling signals and for controlling mechanism on a locomotive, to automatically shut off the motive agent and to apply the brakes, said device having a lever adapted to be depressed by a train-wheel, a cross-head, a connection between the lever and the cross-head to move the latter forward on the downward movement of the lever, a rod attached to the cross-head and extending rearwardly, said rod carrying means for actuating said controller, to set the latter to danger position, and means connected with the rear end of said rod for moving the cross-head of the preceding track device into a normal position, as set forth.

5. A safety gear and signal system for railroads, comprising a track device and a controller for controlling signals and for controlling mechanism on a locomotive, to automatically shut off the motive agent and to apply the brakes, said device having a lever adapted to be depressed by a train-wheel, a cross-head, a connection between the lever and the cross-head to move the latter forward on the downward movement of the lever, a rod attached to the cross-head and extending rearwardly, said rod carrying means for actuating said controller, to set the latter to danger position, and signals connected with and set by said rod, as set forth.

6. A safety gear and signal system for railroads, having a track device, comprising a lever adapted to be engaged by a train-wheel, a link-lever engaging with one end the said wheel-lever and traveling freely at its outer end on a fixed incline, a spring-pressed piston, and a link connection between said lever and the piston-rod of said piston, as set forth.

7. A safety gear and signal system for railroads, having a track device provided with a track-lever adapted to be engaged by a train-wheel, a second lever hung on links and having a friction-roller engaged by the under side of said track-lever, an adjustable block having an incline engaged by another friction-roller on said link-lever, a cylinder, a spring-pressed piston therein, and a connection between the piston and said link, as set forth.

8. A safety gear and signal system for railroads, having a track device provided with a casing having an opening in the top, a lever fulcrumed within the casing and having a portion extending through said opening, and a packing in the walls of said opening for engaging the portion of said lever extending in the opening, as set forth.

9. A safety gear and signal system, provided with a track device having a track-lever adapted to be engaged by a train-wheel, a shaft connected with and adapted to be turned by said lever, wipers on said shaft, and a cross-head mounted to slide longitudinally and having a rod extending rearwardly from the cross-head to actuate a controller and the signals, as set forth.

10. A safety gear and signal system for railroads, having a controller and a track device, the latter comprising a lever adapted to be engaged by a train-wheel, a shaft adapted to be turned by said lever, wipers on said shaft, a cross-head mounted to slide, a rod extending rearwardly from said cross-head for actuating said controller, and a locking device for said cross-head and controlled by arms on said wipers, as set forth.

11. A safety gear and signal system for railroads, having a controller and a track device, the latter comprising a lever adapted to be engaged by a train-wheel, a shaft adapted to be turned by said lever, wipers on said shaft, a cross-head mounted to slide, a rod extending rearwardly from said cross-head for actuating said controller, a locking device for said cross-head and controlled by arms on said wipers, said locking device having a pivoted cap, and depending lugs, one of which is adapted to engage a fixed lug in the track, as set forth.

12. A safety gear and signal system for railroads, having a controller and a track device, the latter comprising a lever adapted to be engaged by a train-wheel, a shaft adapted to be turned by said lever, wipers on said shaft, a cross-head mounted to slide, a rod extending rearwardly from said cross-head for actuating said controller, a locking device for said cross-head and controlled by arms on said wipers, said locking device having a pivoted cap, and depending lugs, one of which is adapted to engage a fixed lug in the track, and the other adapted to be engaged by mechanism controlled by the cross-head rod of the block ahead, as set forth.

13. A safety gear and signal system for railroads, having a controller and a track device in each block, the track device comprising a cross-head mounted to slide longitudinally, a rod connecting the cross-head with the controller in the preceding block, means for moving the cross-head in a forward direction by the action of a train-wheel, and mechanism for moving the cross-head in a rearward or return direction, the mechanism being controlled by the rod of the cross-head in the track device located in the block ahead, as set forth.

14. A safety gear and signal system for railroads, having a controller and a track device in each block, the track device comprising a cross-head mounted to slide longitudinally, a rod connecting the cross-head with the controller in the preceding block, means for moving the cross-head in a forward direction by the action of a train-wheel, mechanism for moving the cross-head in a rearward or return direction, the mechanism being controlled by the rod of the cross-head in the track device located in the block ahead, said mechanism comprising a cross-head mounted to slide longitudinally, arms for engaging the first-named cross-head, and a connection between said arms and the second-named cross-head, as set forth.

15. A safety gear and signal system for railroads, having a track device provided with a spring-pressed cross-head mounted to slide, a cap pivoted thereon and having depending lugs, a fixed lug adapted to be engaged by one of said cap-lugs, and a wiper mounted to swing and having arms for moving said cap, to bring its lug out of engagement with said fixed lug prior to the wiper engaging the cross-head and pushing the same forward, as set forth.

16. A safety gear and signal system for railroads, having a track device provided with a rod extending along the track for operating a controller and signals, a block on said rod, a transverse shaft carrying an arm for engaging said block, and mechanism under the control of the operator for turning said shaft by hand, to move said rod in a rearward direction, as set forth.

17. A safety gear and signal system for railroads, having a controller comprising a rod mounted to slide and provided with a block, and a lever adapted to be engaged by said block to move the latter into an inclined active position, as set forth.

18. A safety gear and signal system for railroads, having a controller comprising a casing, a lever fulcrumed in said casing and extending through an opening in the top thereof, the lever being formed at its under side with an incline, a rod mounted to slide longitudinally, and a block secured on said rod and having an incline adapted to engage the incline on the under side of said lever, as set forth.

19. A safety gear and signal system for railroads, having a controller comprising a casing, a lever fulcrumed in said casing and extending through an opening in the top thereof, the lever being formed at its under side with an incline, a rod mounted to slide longitudinally, a block secured on said rod and having an incline adapted to engage the incline on the under side of said lever, and a spring pressing said lever, to hold the latter normally in a lowermost position, as set forth.

20. A safety gear and signal system for railroads, having a controller comprising a casing, a lever fulcrumed in said casing and extending through an opening in the top thereof, the lever being formed at its under side with an incline, a rod mounted to slide longitudinally, a block secured on said rod and having an incline adapted to engage the incline on the under side of said lever, and guideways held on said casing and engaging said block, to guide the latter on its longitudinal movement, as set forth.

21. A safety gear and signal for railroads, having a controller and a track device, each provided with a cross-head mounted to slide longitudinally and pressed on by springs, and a mechanism connected with the controller cross-head, for moving the track-device cross-head in a longitudinal direction, as set forth.

22. A safety gear and signal system for railroads, having a controller and a track device, each provided with a cross-head mounted to slide longitudinally, and a mechanism connected with and actuated by the controller cross-head and adapted to push the track-device cross-head in a rearward direction at the time the controller cross-head moves forward, as set forth.

23. In a safety gear and signal system for railroads, the combination with a signal, of a controller comprising a pivoted lever and a sliding rod provided with means for engaging the lever to swing it into an inclined position, and means for operating the signal from said rod, as set forth.

24. In a safety gear and signal system for railroads, the combination with a signal, and its operating mechanism, of a controller comprising a pivoted lever, and a sliding rod provided with a block for engaging the lever to swing it into an inclined position, and a lever connecting the block with the signal-operating mechanism, as set forth.

25. In a safety gear and signal system for railroads, the combination with a track-lever adapted to be engaged by a train-wheel, of a pivoted controller-lever, a sliding rod provided with a block adapted to engage the said controller-lever to swing it on its pivot, and means for operating the sliding rod from the track-lever, as set forth.

26. In a safety gear and signal system for railroads, the combination with a track-lever adapted to be engaged by a train-wheel, of a pivoted controller-lever, means for operating the controller from the track-lever, and a signal operated from the controller-lever operating means, as set forth.

27. In a safety gear and signal system for railroads, the combination with a track-lever adapted to be engaged by a train-wheel, of a pivoted controller-lever, a sliding rod provided with a block for engaging the controller-lever to swing it into an inclined position, a signal, and a connection between the signal-operating means and the said block, as set forth.

In testimony whereof I have signed my name to this specification in the presence of two subscribing witnesses.

WILLIAM WARNER MURCH.

Witnesses:
    THEO. G. HOSTER,
    EVERARD BOLTON MARSHALL.